United States Patent
Park et al.

(10) Patent No.: US 7,697,904 B2
(45) Date of Patent: Apr. 13, 2010

(54) METHOD OF COOPERATIVE TRANSMISSION TECHNIQUE IN A ORTHOGONAL FREQUENCY DIVISION MULTIPLE ACCESS UPLINK SYSTEM

(75) Inventors: Seog-Hong Park, Seoul (KR); Jae-Seon Yoon, Seoul (KR); Ho-Jung An, Seoul (KR); Hyoung-Kyu Song, Seongnam-si (KR)

(73) Assignee: Mewtel Technology Inc., Seoul (KR)

( * ) Notice: Subject to any disclaimer, the term of this patent is extended or adjusted under 35 U.S.C. 154(b) by 674 days.

(21) Appl. No.: 11/646,817

(22) Filed: Dec. 28, 2006

(65) Prior Publication Data
US 2008/0159359 A1   Jul. 3, 2008

(51) Int. Cl.
*H04B 1/02* (2006.01)
(52) U.S. Cl. .............. 455/101; 455/91; 455/127.2; 455/115.1; 370/208; 370/480
(58) Field of Classification Search ........... 455/101, 455/91, 127.2, 115.1; 370/208, 480
See application file for complete search history.

(56) References Cited

U.S. PATENT DOCUMENTS

2006/0193245 A1* 8/2006 Aghvami et al. .......... 370/208

OTHER PUBLICATIONS

Digital video broadcasting (DVB); Interaction channel for digital terrestrial television (RCT) incorporating multiple access OFDM, ETSI EN 301958 V1.1.1, 2002.
Digital video broadcasting (DVB); Framing structure, channel coding and modulation for digital terrestrial television (DVB-T), ETS 300744, Mar. 1997.
S. M. Alamouti, "A simple transmit diversity technique for wireless communications," IEEE Journal on Select Areas in Communications, vol. 16, No. 8, pp. 1451-1458. Oct. 1998.
Y. Akyildiz and B. D. Rao, "Maximum ratio combining performance with imperfect channel estimates," Proc. of International Conference on Acoustics, Speech and Signal Processing (ICASSP), vol. 3, pp. 2485-2488. 2002.
J. N. Laneman and G. W. Wornell, "Distributed space-time-coded protocols for exploiting cooperative diversity in wireless networks," IEEE Transactions on Information Theory, vol. 49, No. 10, pp. 2415-2425, Oct. 2003.
A. Sendonaris, E. Erkip, and B. Aazhang, "User Cooperation Diversity- Part I: System Description," IEEE Trans. Commun., vol. 51, No. 11, pp. 1927-1938, Nov. 2003.
A. Sendonaris, E. Erkip, and B. Aazhang, "User Cooperation Diversity- Part II: Implementation Aspects and Performance Analysis," IEEE Trans. Commun., vol. 51, No. 11, pp. 1939-1948, Nov. 2003.

* cited by examiner

*Primary Examiner*—Sanh D Phu
(74) *Attorney, Agent, or Firm*—RatnerPrestia

(57) ABSTRACT

The diversity techniques—space time block code (STBC), maximum ratio combining (MRC)—with multiple antennas provide better reliability than general system. But there are some limitations such as size, cost, hardware complexity, etc, because of multiple antennas. In this letter, we propose a cooperative transmission technique using STBC. We can overcome those limitations and give the gain of cooperative transmission diversity in a concept of virtual multi-input multi-output (MIMO) with single transmit antenna.

2 Claims, 4 Drawing Sheets

| Received signal | $p$-th user | $p'$-th user | Noise |
|---|---|---|---|
| $R(t)$ | $H_1^p X^p(1)$ + | $H_2^{p'} X^{p'}(1)$ | + $W_1$ |
| $R(t+T)$ | $H_1^p X^p(2) + H_2^p \hat{X}^p(1)$ | $+ H_1^{p'} \hat{X}^{p'}(2) + H_2^{p'} X^{p'}(1)$ | + $W_2$ |
| $R(t+2T)$ | $H_1^p X^p(1)^* - H_2^p \hat{X}^p(2)^*$ | $+ H_1^{p'} \hat{X}^{p'}(1)^* - H_2^{p'} X^{p'}(2)^*$ + | $W_3$ |
| $R(t+3T)$ | $H_1^p X^p(3)$ + | $H_1^p X^{p'}(3)$ | + $W_4$ |
| $R(t+4T)$ | $H_1^p X^p(4) + H_2^p \hat{X}^p(3)$ | $+ H_1^{p'} \hat{X}^{p'}(4) + H_2^{p'} X^{p'}(3)$ | + $W_5$ |
| $R(t+5T)$ | $H_1^p X^p(3)^* - H_2^p \hat{X}^p(4)^*$ | $+ H_1^{p'} \hat{X}^{p'}(3)^* - H_2^{p'} X^{p'}(4)^*$ + | $W_6$ |
| ... | | ... | |

Fig. 1
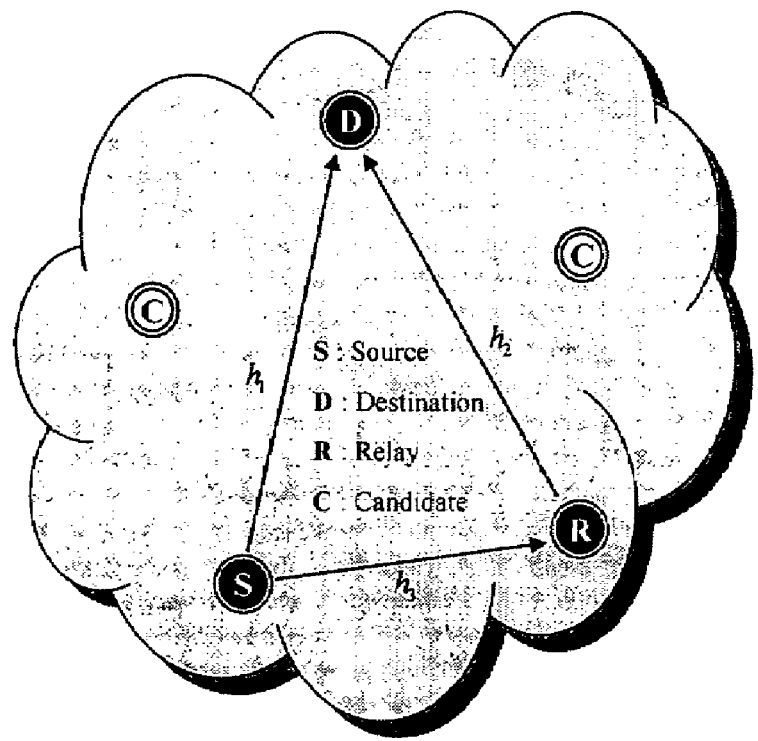
a)
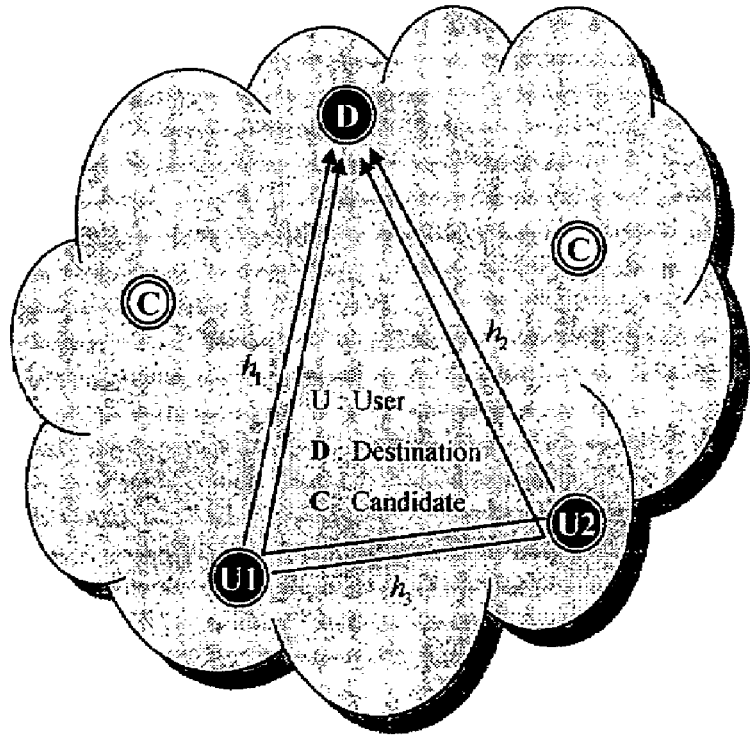
b)

Fig. 2

| Received signal | Channel 1 | Channel 2 | Noise |
|---|---|---|---|
| $\mathbf{R}^p(t)$ | $\mathbf{H}_1^p \mathbf{X}^p(1)\ +$ | $0\ +$ | $\mathbf{W}_1$ |
| $\mathbf{R}^p(t+T)$ | $\mathbf{H}_1^p \mathbf{X}^p(2)\ +$ | $\mathbf{H}_2^p \hat{\mathbf{X}}^p(1)\ +$ | $\mathbf{W}_2$ |
| $\mathbf{R}^p(t+2T)$ | $\mathbf{H}_1^p \mathbf{X}^p(1)^*\ -$ | $\mathbf{H}_2^p \hat{\mathbf{X}}^p(2)^*\ +$ | $\mathbf{W}_3$ |
| $\mathbf{R}^p(t+3T)$ | $\mathbf{H}_1^p \mathbf{X}^p(3)\ +$ | $0\ +$ | $\mathbf{W}_4$ |
| $\mathbf{R}^p(t+4T)$ | $\mathbf{H}_1^p \mathbf{X}^p(4)\ +$ | $\mathbf{H}_2^p \hat{\mathbf{X}}^p(3)\ +$ | $\mathbf{W}_5$ |
| $\mathbf{R}^p(t+5T)$ | $\mathbf{H}_1^p \mathbf{X}^p(3)^*\ -$ | $\mathbf{H}_2^p \hat{\mathbf{X}}^p(4)^*\ +$ | $\mathbf{W}_6$ |
| ... | ... | | |

Fig. 3

| Received signal | $p$-th user | $p'$-th user | Noise |
|---|---|---|---|
| $\mathbf{R}(t)$ | $\mathbf{H}_1^p \mathbf{X}^p(1)\ +$ | $\mathbf{H}_2^{p'} \mathbf{X}^{p'}(1)\ +$ | $\mathbf{W}_1$ |
| $\mathbf{R}(t+T)$ | $\mathbf{H}_1^p \mathbf{X}^p(2) + \mathbf{H}_2^p \hat{\mathbf{X}}^p(1)\ +$ | $\mathbf{H}_1^{p'} \hat{\mathbf{X}}^{p'}(2) + \mathbf{H}_2^{p'} \mathbf{X}^{p'}(1)\ +$ | $\mathbf{W}_2$ |
| $\mathbf{R}(t+2T)$ | $\mathbf{H}_1^p \mathbf{X}^p(1)^* - \mathbf{H}_2^p \hat{\mathbf{X}}^p(2)^* +$ | $\mathbf{H}_1^{p'} \hat{\mathbf{X}}^{p'}(1)^* - \mathbf{H}_2^{p'} \mathbf{X}^{p'}(2)^* +$ | $\mathbf{W}_3$ |
| $\mathbf{R}(t+3T)$ | $\mathbf{H}_1^p \mathbf{X}^p(3)\ +$ | $\mathbf{H}_1^{p'} \mathbf{X}^{p'}(3)\ +$ | $\mathbf{W}_4$ |
| $\mathbf{R}(t+4T)$ | $\mathbf{H}_1^p \mathbf{X}^p(4) + \mathbf{H}_2^p \hat{\mathbf{X}}^p(3)\ +$ | $\mathbf{H}_1^{p'} \hat{\mathbf{X}}^{p'}(4) + \mathbf{H}_2^{p'} \mathbf{X}^{p'}(3)\ +$ | $\mathbf{W}_5$ |
| $\mathbf{R}(t+5T)$ | $\mathbf{H}_1^p \mathbf{X}^p(3)^* - \mathbf{H}_2^p \hat{\mathbf{X}}^p(4)^* +$ | $\mathbf{H}_1^{p'} \hat{\mathbf{X}}^{p'}(3)^* - \mathbf{H}_2^{p'} \mathbf{X}^{p'}(4)^* +$ | $\mathbf{W}_6$ |
| ... | ... | | |

METHOD OF COOPERATIVE TRANSMISSION TECHNIQUE IN A ORTHOGONAL FREQUENCY DIVISION MULTIPLE ACCESS UPLINK SYSTEM

BACKGROUND OF THE INVENTION

1. Field of the Invention

The present invention relates to a method of cooperative transmission in an SISO (single input single output) OFDMA (orthogonal frequency division multiple access) uplink system. More particularly, the present invention relates a method of cooperative transmission technique using STBC. We can overcome limitations of MIMO (multiple input multiple output) and give the gain of cooperative transmission diversity in a concept of virtual MIMO with single transmit antenna

2. Description of the Related Art

Orthogonal frequency-division multiple access (OFDMA) is a combination of orthogonal frequency-division multiplexing (OFDM) and frequency division multiple access (FDMA). Recently, the OFDMA was proposed as one of the reasonable solutions for broadband wireless multiple access systems such as the digital video broadcasting—return channel terrestrial (DVB-RCT) system which is return channel in terrestrial digital video broadcasting (DVB-T). For improved performance of DVB-RCT system, space-time block code (STBC) which increases the capacity and reliability could be considered, and MRC which provides best performance with highest average output SNR could be applied.

In OFDMA uplink system with two transmit antenna, a STBC is exploited to efficiently detect the information by subscriber terminal. To apply a transmitting diversity (TD) scheme, the full rate space-time block code proposed by Alamouti is used at the base station as $$x = \begin{bmatrix} x_1^p & x_2^p \\ -(x_1^p)^* & (x_1^p)^* \end{bmatrix} \quad \text{[Equation 1]}$$

where each row is transmitted from a certain antenna at the same time, and each column is transmitted from a same antenna within two time slot and $(\cdot)^*$ denotes the complex conjugation operation.

And the signals via two antennas are combined with MRC technique as a kind of receiving diversity (RD). Under the assumption of perfect channel estimation, the combined signal of p-th user, in the frequency domain, is represented by $$\hat{X}^p = (H_1^p)^* \cdot R_1^p + (H_2^p)^* \cdot R_2^p \quad \text{[Equation 2]}$$

where $\hat{X}^p$ and $H_i^p$ denote detected signal and the channel between the transmitter and the i-th receiver respectively. And $R_i^p$ represents the received signal of p-th user at i-th antenna in [Equation 2].

SUMMARY OF THE INVENTION

Orthogonal frequency-division multiple access (OFDMA) is a combination of orthogonal frequency-division multiplexing (OFDM) and frequency division multiple access (FDMA). Recently, the OFDMA was proposed as one of the reasonable solutions for broadband wireless multiple access systems such as the digital video broadcasting—return channel terrestrial (DVB-RCT) system which is return channel in terrestrial digital video broadcasting (DVB-T). For improved performance of DVB-RCT system, space-time block code (STBC) which increases the capacity and reliability could be considered, and MRC which provides best performance with highest average output SNR could be applied. But, it needs more size, cost, simultaneous transmission and reception by same transceiver and hardware complexity to employ additional antennas. Moreover, sufficient spaces between antennas are required to guarantee the independence of each channel and the devices which use multiple antennas should be enlarged.

A cooperative transmission technique applying virtual MIMO with STBC matrix is proposed. The source and relay signaling structure of the single cooperative transmission technique is shown below.

$$x^p = \left\{ \frac{1}{\sqrt{2}} x^p(1), \overbrace{\frac{1}{\sqrt{2}} x^p(2), \frac{1}{\sqrt{2}} x^p(1)^*}^{STBC\ matrix}, \frac{1}{\sqrt{2}} x^p(3), \ldots \right\}$$

$$x_r^{p'} = \left\{ 0, \frac{1}{\sqrt{2}} \hat{x}^p(1), -\frac{1}{\sqrt{2}} \hat{x}^p(2)^*, 0, \ldots \right\}$$

The signaling structure of the dual cooperative transmission technique is shown below.

$$x^p = \left\{ \frac{1}{\sqrt{2}} x^p(1), \overbrace{\frac{1}{\sqrt{2}} x^p(2) + \frac{1}{\sqrt{2}} \hat{x}^{p'}(1), \frac{1}{\sqrt{2}} x^p(1)^* - \frac{1}{\sqrt{2}} \hat{x}^{p'}(2)^*}^{STBC\ matrix\ for\ p-th\ user,\ only\ elements\ of\ p}, \ldots \right\}$$

$$x^{p'} = \left\{ \frac{1}{\sqrt{2}} x^{p'}(1), \frac{1}{\sqrt{2}} \hat{x}^p(1) + \frac{1}{\sqrt{2}} x^{p'}(2), -\frac{1}{\sqrt{2}} \hat{x}^p(2)^* + \frac{1}{\sqrt{2}} x^{p'}(1)^*, \ldots \right\}$$
$$\underbrace{\phantom{xxxxxxxxxxxxxxxxxxxxxxxxxxxxxxxxxxxxxxxxxxxxxxxxxx}}_{STBC\ matrix\ for\ p'-th\ user,\ only\ elements\ of\ p'}$$

BRIEF DESCRIPTION OF THE DRAWINGS

Further objects and other advantages of the present invention will become apparent from the following description in conjunction with the attached drawings, in which:

FIG. 1 is a concept diagram of a cooperative transmission technique.

FIG. 2 is a table of a single cooperative transmission technique.

FIG. 3 is a table of a dual cooperative transmission technique.

DETAILED DESCRIPTION OF THE PREFERRED EMBODIMENTS

Figure 4:
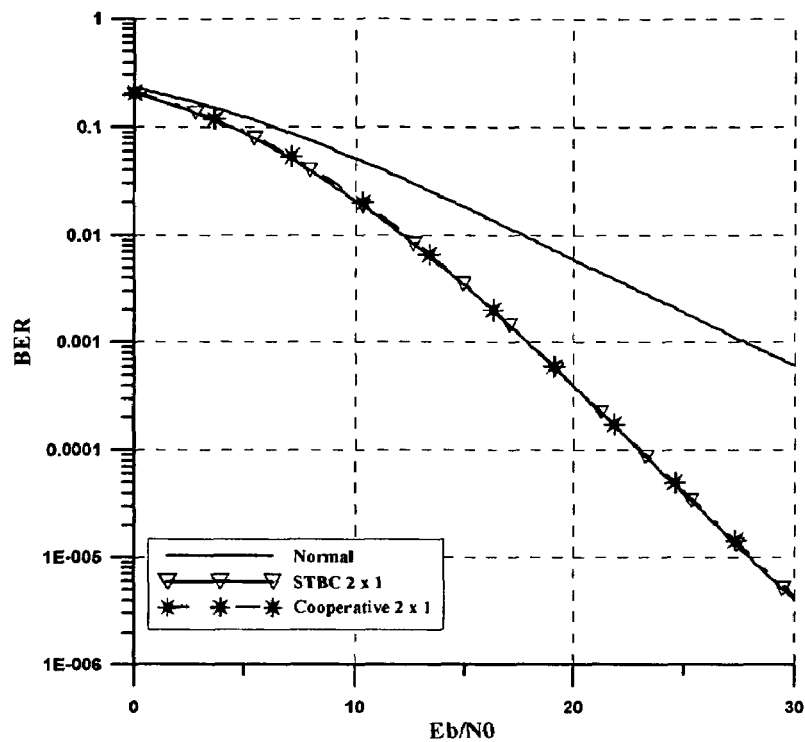
FIG. 4 is BER performance of method of a cooperative transmission technique with perfect relay channel compared with the BER performance of STBC.

Preferred embodiments of the present invention will now be described in detail with reference to the accompanying drawings.

We consider an OFDMA UPLINK system which consists of K subcarriers. To allow access by multiple users, a subcarrier or a cluster of subcarriers is assigned to each user and the assigned subcarriers orthogonally are overlapped. The transmitted signal for the p-th user on time t can be written as $$x^p(t) = \frac{1}{K}\sum_{n=0}^{K-1} X^p(k)\exp\left(\frac{j2\pi kn}{K}\right) \quad \text{[Equation 1]}$$

where $X^p(k)$ is the frequency domain component of the p-th user through an inverse discrete Fourier transform (IDFT) and n is a variable of K IDFT-point. $X^p(k)$ can be written as $$X^p(k) = \begin{cases} X(k) & k \in C_p \\ 0 & \text{otherwise} \end{cases} \quad \text{[Equation 2]}$$

where $X(k)$ and $C_p$ represent the OFDM symbol and the frequency-domain subcarrier index set for the p-th user, respectively.

The baseband signal at the input to the receiver on time t can be briefly written as $$r(t) = \frac{1}{K}\sum_{p=1}^{P}\sum_{n=0}^{K-1} H^p(k)X^p(k)\exp\left(\frac{j2\pi kn}{K}\right) + w(t) \quad \text{[Equation 3]}$$

where w(t) is the additive white Gaussian noise (AWGN) with zero mean and variance $2N_0$.

We propose the single and dual cooperative transmission techniques which use decode-and-forward type. And we assume to simultaneous transmission and reception. Decode-and-forward technique was presented in 2003 which has motivated many researches in the area of wireless network [6]. In this technique, two devices are coupled to help each other. FIG. 1 shows how the cooperative transmission techniques work. The cooperative transmission technique allows the power consumption of other device, but the baseline transmit power is reduced because of cooperative diversity gain. If the relay device translates the signals of source device perfectly, the performance would be the same as a device that uses STBC with two transmitting antennas and one receiving antenna.

The single cooperative transmission technique is depicted by line in FIG. 1. First, the source device tries to find the best coworker among several candidates. Second, the selected device receives the signals from the source device and executes some processes. Third, the processed signals are retransmitted to the destination device. Last, the destination device receives two independently faded signals. The source and relay signaling structure of the single cooperative transmission technique is shown below.

$$x^p = \left\{\frac{1}{\sqrt{2}}x^p(1), \overbrace{\frac{1}{\sqrt{2}}x^p(2), \frac{1}{\sqrt{2}}x^p(1)^*}^{STBC\,matrix}, \frac{1}{\sqrt{2}}x^p(3), \ldots\right\}$$

-continued $$x_r^{p'} = \left\{0, \frac{1}{\sqrt{2}}\hat{x}^p(1), -\frac{1}{\sqrt{2}}\hat{x}^p(2)^*, 0, \ldots\right\}$$

where $x^p$ is transmitting signal of p-th user, and $x_r^{p'}$ is transmitting signal of p'-th user for relay.

We assume that the total transmit power of cooperative mode is the same as that of non-cooperative mode. Therefore, we set the signal power to $1/\sqrt{2}$. Note that each 4 components are grouped by STBC matrix in [Equation 4]. The p'-th relay user receives $$r_r(t) = h_3 x^p(t) + w_r(t) \quad \text{[Equation 5]}$$

where $r_r(t)$ indicates received signal of the p'-th relay device on time t, $w_r(t)$ denotes noise factor of the relay device on time t, and $h_3$ is relay channel. It immediately decodes the source signals through a discrete Fourier transform (DFT), in frequency domain, as shown below.

$$\hat{X}^p(t) = H_3^{p*}R_r(t) = |H_3^p|^2 X^p(t) + H_3^{*}W_r(t) \quad \text{[Equation 6]}$$

After decoding the source signals, the relay device encodes decoded signals to OFDMA symbol and retransmits them to the destination device. Consequently, the destination device receives the signals which consist of source symbols, channel components, and noise. FIG. 2 presents the composition of received signals at the destination device for the single cooperative transmission technique in case the signal power is equal to 1 by [Equation 4]. Note that each 4 components are grouped by STBC matrix in [Equation 4] and FIG. 2. If it is assumed that the estimation of the relay device is exact; $\hat{X}^p(t)$ become $X^p(t)$. Therefore the received signals of p-th user can be expressed as $$R^p(t+T) = H_1^p X^p(2) + H_2^p X^p(1) + W_2$$

$$R^p(t+2T) = H_1^p X^p(1)^* - H_2^p X^p(2)^* + W_3 \quad \text{[Equation 7]}$$

Finally, the received signal of p-th user through cooperative transmission technique can be estimated by combining scheme like STBC.

$$\hat{X}^p(1) = H_2^{p*}R^p(t+T) + H_1^p R^p(t+2T)^*$$

$$\hat{X}^p(2) = H_1^{p*}R^p(t+T) - H_2^p R^p(t+2T)^* \quad \text{[Equation 8]}$$

Substituting [Equation 9] into [Equation 10] we get $$\hat{X}^p(1) = (|H_1^p|^2 + |H_2^p|^2)X^p(1) + H_1^p W_3^* + H_2^{p*}W_2$$

$$\hat{X}^p(2) = (|H_1^p|^2 + |H_2^p|^2)X^p(2) + H_1^{p*}W_2 - H_2^p W_3^* \quad \text{[Equation 9]}$$

We find that if the relay device decodes the signals from the source device perfectly, our scheme provides the same BER performance as standard two-transmit antenna system that uses STBC.

The dual cooperative transmission technique is depicted by the dashed line in FIG. 1. The dual cooperative transmission technique can be got by using similar technique in the single cooperative transmission technique. The signaling structure of the dual cooperative transmission technique is shown below.

$$x^p = \left\{ \frac{1}{\sqrt{2}}x^p(1), \underbrace{\frac{1}{\sqrt{2}}x^p(2) + \frac{1}{\sqrt{2}}\hat{x}^{p'}(1), \frac{1}{\sqrt{2}}x^p(1)^* - \frac{1}{\sqrt{2}}\hat{x}^{p'}(2)^*}_{\text{STBC matrix for p-th user, only elements of } p}, \ldots \right\}$$

$$x^{p'} = \left\{ \frac{1}{\sqrt{2}}x^{p'}(1), \underbrace{\frac{1}{\sqrt{2}}\hat{x}^p(1) + \frac{1}{\sqrt{2}}x^{p'}(2), -\frac{1}{\sqrt{2}}\hat{x}^p(2)^* + \frac{1}{\sqrt{2}}x^{p'}(1)^*}_{\text{STBC matrix for p'-th user, only elements of } p'}, \ldots \right\}$$

[Equation 10]

Like the operating devices in a single cooperative transmission technique, each user receives and decodes signals of cooperative user. After that it transmits OFDMA signal which adds up own symbols and symbols of cooperative user.

FIG. 3 presents the composition of received signals at the destination device for the dual cooperative transmission technique in case the signal power is equal to 1 by [Equation 10] If the same assumption like the single cooperative transmission technique is considered, the estimated values at the destination device, $\tilde{X}^p(1)$ and $\tilde{X}^p(2)$ are computed the same way as [Equation 7], [Equation 8], and [Equation 9]. And the received signals of p'-th user can be expressed as $$R^{p'}(t+T) = H_1^{p'} X^{p'}(2) + H_2^{p'} X^{p'}(1) + W_2$$

$$R^{p'}(t+2T) = H_1^{p'} X^{p'}(1)^* - H_2^{p'} X^{p'}(2)^* + W_3 \quad \text{[Equation 11]}$$

Therefore, $\tilde{X}^{p'}(1)$ and $\tilde{X}^{p'}(2)$ can be estimated by $$\tilde{X}^{p'}(1) = H_2^{p'*} R^{p'}(t+T) + H_1^{p'} R^{p'}(t+2T)^*$$

$$\tilde{X}^{p'}(2) = H_1^{p'*} R^{p'}(t+T) - H_2^{p'} R^{p'}(t+2T)^* \quad \text{[Equation 12]}$$

In the end, the source symbol of p'-th user is estimated as $$\tilde{X}^{p'}(1) = (|H_1^{p'}|^2 + |H_2^{p'}|^2) X^{p'}(1) + H_1^{p'} W_3 + H_2^{p'*} W_2$$

$$\tilde{X}^{p'}(2) = (|H_1^{p'}|^2 + |H_2^{p'}|^2) X^{p'}(2) + H_1^{p'*} W_2 - H_2^{p'} W_3^* \quad \text{[Equation 13]}$$

We notice that the dual cooperative transmission gives the same BER performance as standard two-transmit-antenna system that uses STBC, too.

In the OFDMA uplink system, FFT size (the length of symbol) and the number of user are 256 and 16, respectively. And symbol is modulated by QPSK (default). The channel model is DVB-RCT CM 2 with 20-multipath fading. This channel is assumed that each of path experiences frequency-nonselective and slow fading.

First of all, we can be guessed that the BER performance of the proposed technique is similar to the one of the STBC.

Figure 5:
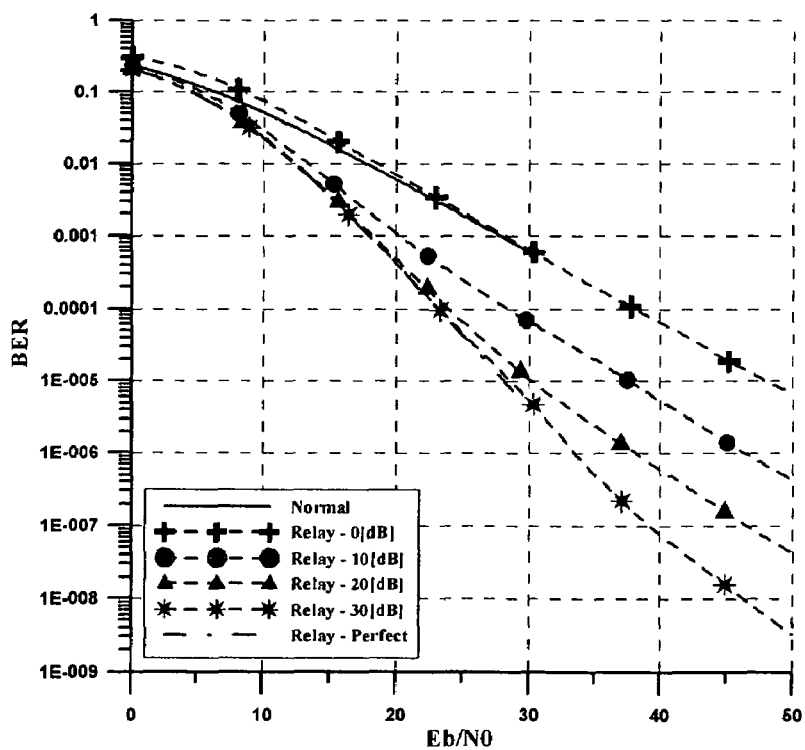
FIG. 5 is BER performance of method of a single cooperative transmission technique according to relaying channel.
Figure 6:
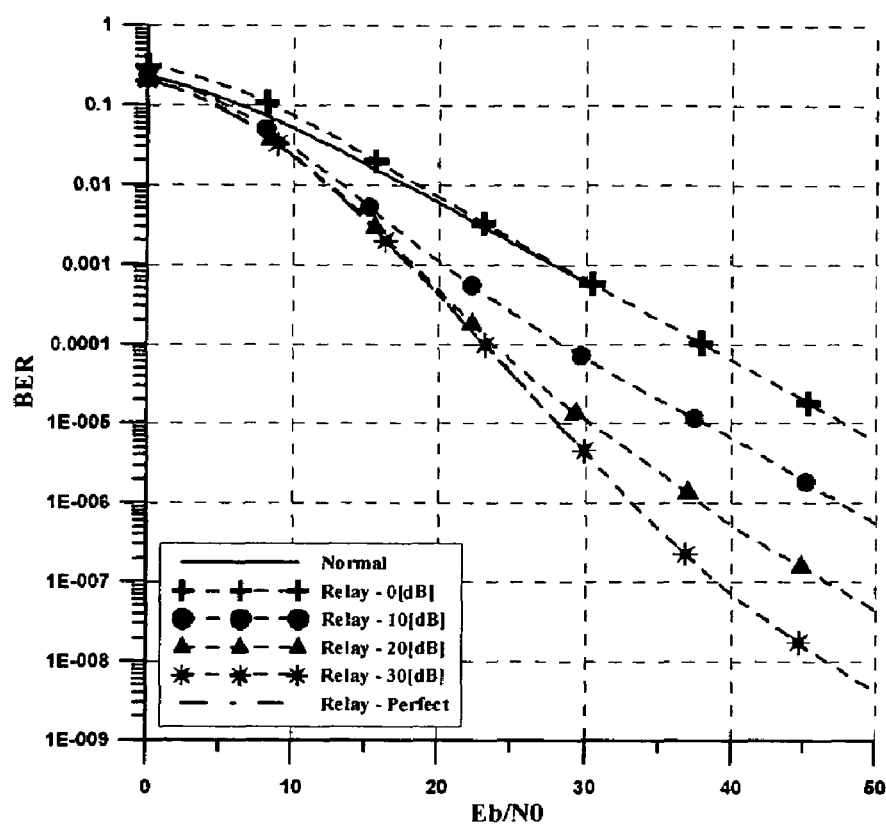
FIG. 6 is BER performance of method of a dual cooperative transmission technique according to relaying channel.

FIG. 4 shows that the BER curve of the cooperative transmission technique is overlapped with the one of the STBC. Therefore, the BER performance of this proposed technique satisfies improved reliability of communication like the STBC. But the condition of relay channel assumed perfect; the symbol of p-th user was transmitted to p'-th user without error. Hence, FIG. 5 and FIG. 6 show the BER performance of proposed technique in various condition of relay channel. In FIG. 5, we can show the BER performance of the single cooperative transmission technique when the condition of relay channel is increased from 0[dB] to 30[dB]. The condition of relay channel is the positive difference between $h_1$ and $h_3$ in FIG. 1; $h_3$ is better than $h_1$. If the condition of relay channel is bad, the cooperative communication mode gives a bad outcome. We find the fact that the cooperative transmission technique with imperfect relay channel is approached to the one with perfect relay channel when $h_3$ is about 20[dB] higher than $h_1$. So we can show that the BER performance of this proposed technique satisfies improved reliability of communication like the STBC, if the condition of relay channel is assumed perfect.

And FIG. 6 depicts the BER performance of the dual cooperative transmission technique when the condition of relay channel is increased from 0[dB] to 30[dB], too. We find the fact that the BER performance of dual cooperative transmission technique approximates single cooperative transmission technique. Therefore, FIG. 6 shows that simultaneous cooperative transmitting between users cannot affect the BER performance of each user in OFDMA uplink system. By using cooperative transmission technique, we could confirm that users have reliability like BER performance of STBC without several limitations such as cost, complexity, space, etc.

The main disadvantage of OFDMA uplink system using conventional STCs transmission technique is to need more size, cost, hardware complexity to employ additional antennas, and the independence of each channel. In order to solve this problem, we proposed the single and dual cooperative transmission technique in this letter. As a result, in case the relay decodes the source's signal perfectly, the proposed technique has the same BER performance as standard STBC. However, its data rate is decreased to ⅔ of conventional STBC transmission technique since the signals of p-th user and p'-th user are only transmitted own symbol at time t, t+3T, t+5T, . . . for relay. Hence, we could investigate the cooperative transmission technique with full data rate.

What is claimed is:

1. A method of transmitting a signal comprising:
transmitting a first signal from a source device, according to a first space-time block code (STBC) matrix, to a relay device and a destination device; and
transmitting a second signal from the relay device to the destination device, according to a second STBC matrix, the transmitted second signal based on the first signal received by the relay device from the source device,
wherein the first signal and the second signal are respectively represented according to the following:

$$x^p = \left\{ \frac{1}{\sqrt{2}}x^p(1), \overbrace{\frac{1}{\sqrt{2}}x^p(2), \frac{1}{\sqrt{2}}x^p(1)^*}^{\text{STBC matrix}}, \frac{1}{\sqrt{2}}x^p(3), \ldots \right\} \quad \text{[Equation 4]}$$

$$x_r^{p'} = \left\{ 0, \frac{1}{\sqrt{2}}\hat{x}^p(1), -\frac{1}{\sqrt{2}}\hat{x}^p(2)^*, 0, \ldots \right\}$$

where $\hat{x}^p$ represents the first signal as received by the relay device and $(\cdot)^*$ represents the complex conjugate operation.

2. A method of transmitting a signal comprising:

transmitting a first signal from a first device for a p-th user, according to a first space-time block code (STBC) matrix, to a second device and a destination device; and transmitting a second signal from the second device for a p'-th user, according to a second STBC matrix, to the first device and the destination device, the transmitted second signal based on a predetermined second signal and the first signal as received by the second device, represented as $\hat{x}^p$, wherein the transmitted first signal is based on a predetermined first signal and the second signal as received by the first device, represented as $\hat{x}^{p'}$, and the first signal and the second signal are respectively represented according to the following:

$$x^p = \left\{ \frac{1}{\sqrt{2}}x^p(1), \overbrace{\frac{1}{\sqrt{2}}x^p(2) + \frac{1}{\sqrt{2}}\hat{x}^{p'}(1), \frac{1}{\sqrt{2}}x^p(1)^* - \frac{1}{\sqrt{2}}\hat{x}^{p'}(2)^*}^{\text{STBC matrix for p-th user, only elements of p}}, \ldots \right\}$$

$$x^{p'} = \left\{ \frac{1}{\sqrt{2}}x^{p'}(1), \underbrace{\frac{1}{\sqrt{2}}\hat{x}^p(1) + \frac{1}{\sqrt{2}}x^{p'}(2), -\frac{1}{\sqrt{2}}\hat{x}^p(2)^* + \frac{1}{\sqrt{2}}x^{p'}(1)^*}_{\text{STBC matrix for p'-th user, only elements of p'}}, \ldots \right\}.$$

where $(\cdot)^*$ represents the complex conjugate operation.

* * * * *

UNITED STATES PATENT AND TRADEMARK OFFICE
CERTIFICATE OF CORRECTION

PATENT NO. : 7,697,904 B2 Page 1 of 1
APPLICATION NO. : 11/646817
DATED : April 13, 2010
INVENTOR(S) : Seog-Hong Park et al.

It is certified that error appears in the above-identified patent and that said Letters Patent is hereby corrected as shown below:

In column 4, line 5, to the right of the equation please insert --[Equation 4]--.
In column 6, line 58, please delete "[Equation 4]" after the equation.

Signed and Sealed this

Thirteenth Day of July, 2010

David J. Kappos
*Director of the United States Patent and Trademark Office*